H. W. KIMES.
AUTOMATIC PRESSURE REGULATOR.
APPLICATION FILED DEC. 23, 1911.
1,042,008.
Patented Oct. 22, 1912.
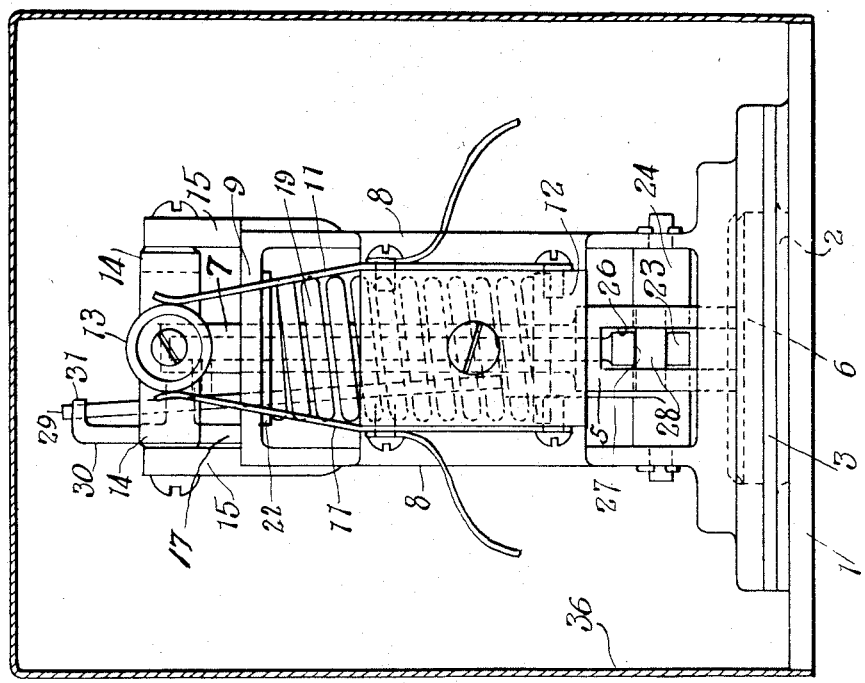
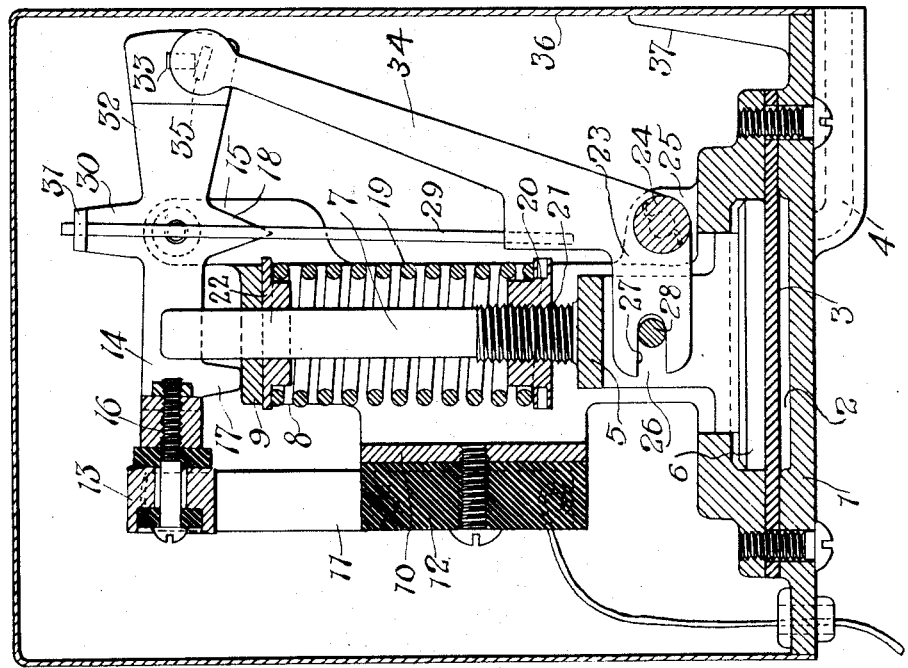
Witnesses
G Howard Walmsley.
Harriet L Hammaker.
Inventor
Hugh W. Kimes,
By Toulmin & Reed
Attorneys

UNITED STATES PATENT OFFICE.

HUGH W. KIMES, OF DAYTON, OHIO, ASSIGNOR TO THE VAILE AND KIMES COMPANY, OF DAYTON, OHIO, A CORPORATION OF OHIO.

AUTOMATIC PRESSURE-REGULATOR.

1,042,008.  Specification of Letters Patent.  Patented Oct. 22, 1912.

Application filed December 23, 1911. Serial No. 667,440.

*To all whom it may concern:*

Be it known that I, HUGH W. KIMES, a citizen of the United States, residing at Dayton, in the county of Montgomery and State of Ohio, have invented certain new and useful Improvements in Automatic Pressure-Regulators, of which the following is a specification, reference being had therein to the accompanying drawing.

This invention relates to automatic pressure regulators and is designed more particularly for use in connection with private water sytems where water and air are stored under pressure sufficient to force the former through the pipes of the water system. The water is usually forced into the tanks under pressure by means of power-driven pumps and regulating devices have been provided which aim to start the pump when the pressure in the tank has fallen below a given point and to stop the same when the pressure has risen above a higher point. These regulating devices for the most part have not been wholly satisfactory, one of the principal objections to them being their tendency to gradually open or close, as the case may be, the cut-off controlling the admission of the actuating medium to the motor. As a result there will be times when the cut-off will remain in a partially closed position which will permit the passage of the actuating medium in small quantities, but not in sufficient quantities to properly operate the motor. Inasmuch as the quantity of the actuating medium passing to the motor is not sufficient to properly operate the same the pressure in the tank will not rise and consequently the closing of the cut-off will not be completed and the medium will continue to pass through the same in small quantities until the pressure in the tank has been reduced so far that the controlling device will again open the cut-off and permit the passage of sufficient quantities of the actuating medium to operate the motor. Where the motor is actuated by water power a waste of water will result. Where an electric motor is utilized there will not only be a waste of current but the improper closing of the switch frequently results in sparking at the terminals with its resultant disadvantages.

The object of the present invention is to overcome these disadvantages and produce a regulator which will quickly and positively impart to the cut-off its complete movement. To this end it is a further object of the invention to provide a regulator in which the movable member of the cut-off will be held against movement until the pressure in the tank is sufficient to impart to it its complete movement; and further, to provide such a regulator which will be simple in its construction, positive in its operation and which can be produced at a relatively low cost.

In the accompanying drawings, Figure 1 is a vertical section, taken centrally through a regulating device embodying my invention; and Fig. 2 is a front elevation of the device with the inclosing casing in section.

In these drawings I have illustrated one embodiment of my invention and have shown the same as applied to a cut-off for an electric motor. It will be obvious, however, that it will require immaterial modifications only to adapt the device to cut-offs of other kinds.

In the particular embodiment of the invention here illustrated I have shown the same as comprising a hollow base 1 having its interior chamber 2 divided by means of a diaphragm 3 into two compartments, one of which communicates by means of a conduit 4 with the tank or other receptacle within which the fluid is to be stored under pressure. A plunger 5 is mounted in the upper portion of the base and has an enlarged lower portion, as shown at 6, which is supported on the diaphragm, and a stem 7 extending beyond the base. Mounted on the base and, in the present arrangement of the device, extending upwardly therefrom is a bracket comprising parallel side members 8 connected at their upper ends by a horizontal cross bar 9 and also connected at their front edges by a vertically arranged cross bar 10, both cross bars being preferably formed integral with the vertical arms of the bracket, which in turn may be formed integral with the upper portion of the base.

As before stated the present embodiment of the invention is designed to operate a cut-off for an electric motor and the cut-off consists of fixed and movable contact members. The fixed contact member preferably comprises two resilient contact fingers 11 rigidly secured to the opposite sides of a block of fiber or other suitable insulating material, 12, which, in turn, is rigidly secured to the transverse bar 10 of the bracket. The arms 11 converge upwardly and have their upper ends flared to facilitate the entrance of the movable contact member. The movable member, in the form here shown, comprises a cylindrical body of metal, indicated at 13, which is carried by a movable support. In this construction the movable support is in the form of a U-shaped lever 14 having its arms pivotally connected, at the open end of the lever, to upwardly extending projections 15 carried by and forming parts of the bracket. The contact member 13 is secured to the transverse portion of the U-shaped lever by means of a bolt 16 or in any other suitable manner. The lever 14 is provided with stops or fingers 17 and 18 adapted to engage the top and rear edge, respectively, of the upper transverse member 9 of the bracket to limit the movement of the lever about its axis.

The upward movement of the plunger 5 under the influence of the pressure in the lower compartment of the chamber 2 is resisted by means of a spring 19 coiled about the stem 7 and confined between a washer 20, adjustably mounted upon a screw-threaded portion 21 of the stem, and a second washer 22 loosely mounted on the stem and bearing against the upper transverse bar 9 of the bracket. This spring has two functions, the first being to prevent the upward movement of the plunger until the pressure in the tank has reached a predetermined degree, this degree being variable by adjusting the position of the lower washer 20 on the stem. The second function is that of returning the plunger and the diaphragm to their normal positions as the pressure in the tank falls.

An operative connection is established between the plunger and the support for the movable member of the cut-off, whereby the movement of the plunger will actuate the cut-off. In the present instance this connection comprises a bell crank lever 23 carried by a shaft 24 journaled in lugs 25 mounted on the base 1. One arm of this lever is connected with the plunger 5, preferably by providing the lower portion thereof with an opening 26 to receive the arm of the lever 25 and forming a slot 27 in the end of the arm to receive a pin 28 having its end mounted in the plunger on the opposite sides of the opening 26. The other arm of the lever is resiliently connected with the lever 14 carrying the movable member of the cut-off. In the present form of the device this resilient connection comprises a spring, preferably formed of a rod or bar 29 of resilient material, such as spring steel, one end of which is rigidly secured to the bell crank lever and the other end of which is connected with the supporting lever 14. This connection may be formed by providing the supporting lever 14 with an upwardly extending projection 30 arranged immediately above the axis of the lever and having a laterally extending apertured lug 31 to receive the upper end of the rod 29. It is apparent, therefore, that the movement of the diaphragm and the plunger will place the resilient rod or spring 29 under tension and when this tension is sufficient to overcome the resistance offered to the movement of the movable contact member the supporting lever for this member will be moved about its axis. To prevent the movable member of the cut-off being gradually moved from one position to another I provide means to hold the lever and the contact member against all movement until the tension of the spring or rod 29 is sufficient to impart to the lever 14 its full movement, which tension is applied to the spring only when the pressure in the tank has reached its upper or lower limit. For this purpose I provide a retaining device comprising an extension 32 rigidly connected to the lever 14 and having on one of its vertical faces a laterally projecting lug 33. The upwardly extending arm of the bell crank lever is also provided with an extension, 34, having on that face thereof adjacent to the lug 33 a laterally extending lug 35 adapted to coöperate with the lug 33 to lock the lever 14 against movement. The lug 33 is preferably narrow while the lug 35 is of a relatively large width. The lugs are so arranged on their respective supporting members that when the lever 14 is in one position the lug 35 will lie beneath the lug 33 and prevent the downward movement of the extension 32 and consequently the upward movement of that end of the lever 14 carrying the movable member of the cut-off. When the lever 14 is in its other position the lug 35 will lie above the lug 33, thus holding the extension 32 against upward movement. The width of the lug 35 and consequently the distance it must move to release the lug 33 and the lever 14 is such that the movement of the bell crank lever necessary to impart this amount of movement to the lug will place the rod or spring 29 under such a tension that as soon as the lug 35 clears the lug 33 the spring will impart to the lever 14 a quick positive movement sufficient to carry the movable member of the cut-off through its complete movement.

The points of connection of the rod 29 to the bell crank lever 23 and the extension 30 on the lever 14 are always in substantial alinement with the axis of the lever and consequently the rod or spring will be idle, that is, under no tension, when the movable member of the cut-off is in its operative or inoperative position and the pressure in the tank is at its lowest or highest limit. As this pressure varies, however, and the diaphragm begins to move in one direction or the other the bell crank lever will be caused to move with the diaphragm, and inasmuch as the lever 14 is held against movement the spring or rod will be placed under tension. This tension will gradually increase until the bell crank lever has been moved a distance sufficient to release the lug 33 and permit the lever 14 to move under the influence of the spring or rod. The stops 17 and 18 on the lever 14 are so arranged that when the lever has reached the limit of its movement in either direction the spring 29 will still be under a slight tension. The pressure on the plunger which resulted in placing the spring or rod under tension having been relieved by the starting or stopping of the motor, as the case may be, this residual tension of the rod or spring 29 will tend to move the bell crank lever into such a position as to relieve the tension, thereby moving the lug 35 into its proper relation to the lug 33 to lock the lever 14 against movement.

The whole mechanism is preferably inclosed in a casing 36 mounted upon suitable lugs 37 carried by the base 1.

The operation of the device has been fully explained in connection with the description of the several parts thereof and it will be apparent that I have produced an automatic pressure regulator which will be quickly and positively actuated to impart to the movable member of the cut-off its complete movement, thereby eliminating all drag from the movement of this member; and further, that I have produced a device of this character which is simple in its construction and operation; which will require little or no attention after it has been installed; and which can be manufactured at a relatively low cost.

While I have shown and described one embodiment of the invention it will be understood that this is chosen for the purpose of illustration only and that I do not wish to be limited to the details of construction shown and described, for obvious modifications will occur to a person skilled in the art.

Having thus fully described my invention, what I claim as new and desire to secure by Letters Patent, is:—

1. In a device of the character described, a cut-off having a movable member, a pressure-controlled device to actuate the movable member of said cut-off, and a pressure-controlled retaining device to hold said movable member at either limit of its movement.

2. A device of the character described comprising a cut-off having a movable member, a retaining device to hold said movable member against movement, a pressure-controlled device, and means operated by said pressure-controlled device to release and actuate said movable member.

3. A device of the character described comprising a cut-off having a movable member, a lever connected with said movable member, a pressure-controlled device connected with said lever, a retaining device to hold said lever against movement, and a connection between said retaining device and said pressure-controlled device, whereby said retaining device will be actuated to release said lever before the connection between said lever and said pressure-controlled device becomes operative.

4. A device of the character described comprising a cut-off having a movable member, a pivoted support for said movable member, a pressure-controlled device, a resilient connection between said pressure-controlled device and said pivoted support to actuate the latter, a retaining device to hold said pivoted support normally against movement, and a connection between said retaining device and said pressure-controlled device.

5. In a device of the character described, a circuit breaker and closer comprising a plurality of members, a movable support for one of said members, a diaphragm, a lever connected with said diaphragm, a spring connecting said lever with said movable support, a retaining device for said movable support, and a connection between said lever and said retaining device to cause the latter to hold said movable support against movement until said lever has completed its movement and then to release the same, whereby said spring is placed under tension before said movable support is released.

6. In a device of the character described, a circuit breaker and closer comprising a plurality of members, a lever supporting one of said members, a diaphragm, a bell crank lever having one arm connected to and movable with said diaphragm, a resilient bar connected to and forming a part of the other arm of said bell crank lever and also connected with the first-mentioned lever to actuate the same, and coöperating parts carried by the respective levers to hold the first-mentioned lever against movement during the movement of the bell crank lever, thereby causing said resilient bar to be placed under tension before the first-mentioned lever is released.

7. In a device of the character described, a hollow base, a bracket carried by said base, a diaphragm mounted in said base, a vertically movable plunger supported on said diaphragm and extending beyond said base, a spring confined between said plunger and said bracket, a switch comprising a fixed contact member mounted on said bracket, and a movable contact member, a supporting lever for said movable contact member mounted on said bracket, a bell crank lever mounted on said base and having one arm connected to and movable with said plunger, a resilient bar secured at one end to the other arm of said bell crank lever and connected at its other end with said supporting lever, both of said levers having extensions, lugs carried by said extensions and normally coöperating to hold said supporting lever against movement, said lugs being so arranged that the lug on the bell crank lever will lie on one side of the lug on said supporting lever when the latter is in one position and will lie on the other side of said lug when said lever is in another position.

8. The combination, with a cut-off having a member movable into operative and inoperative positions, of means to positively retain said member in either of said positions, and a pressure-controlled device to release said member from said retaining means.

9. The combination, with a cut-off having a member movable into operative and inoperative positions, of means to positively retain said member in either of said positions, and a pressure-controlled device to release said member from said retaining means and to reverse the position thereof.

In testimony whereof, I affix my signature in presence of two witnesses.

HUGH W. KIMES.

Witnesses:
J. W. AIKMAN,
HARRIET L. HAMMAKER.